May 6, 1930.  C. C. GROTNES  1,757,626
METAL WORKING MACHINE
Filed Jan. 6, 1928   2 Sheets-Sheet 1

Inventor:
Carl C. Grotnes,
By Chindoll, Parker & Carlson
Attys.

May 6, 1930.  C. C. GROTNES  1,757,626
METAL WORKING MACHINE
Filed Jan. 6, 1928   2 Sheets-Sheet 2
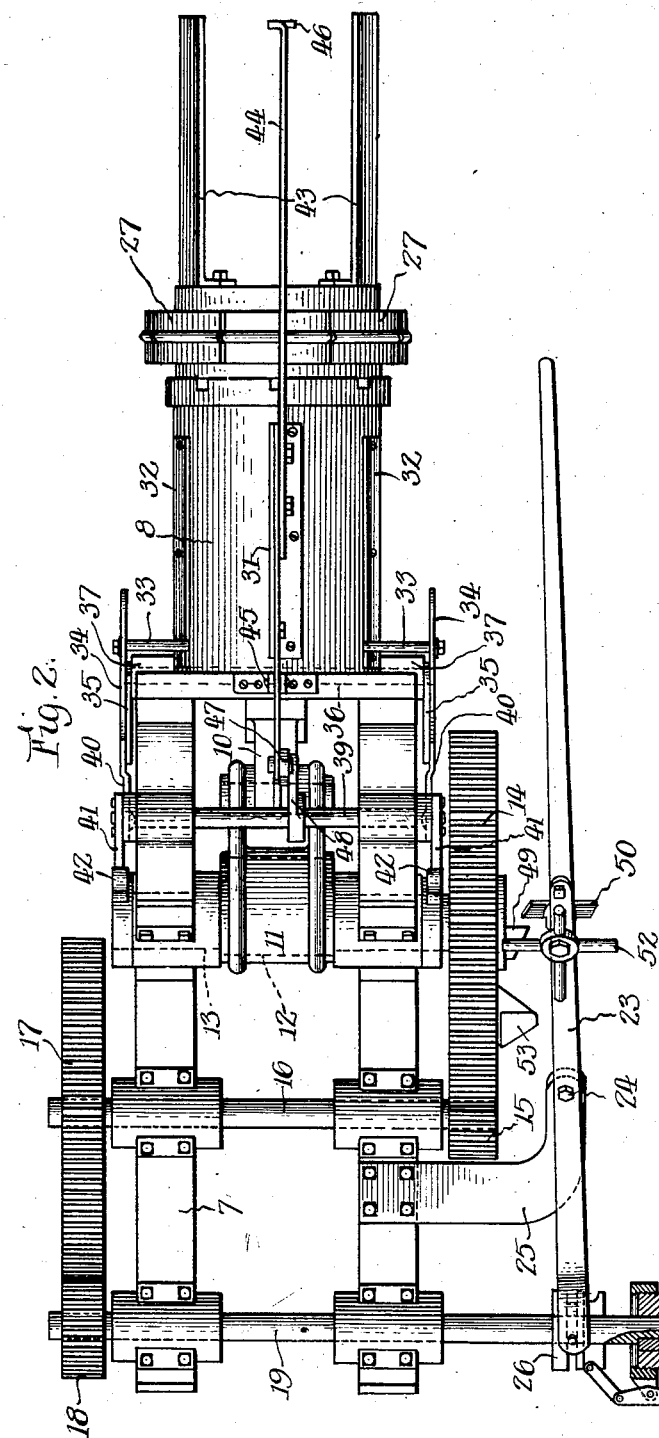
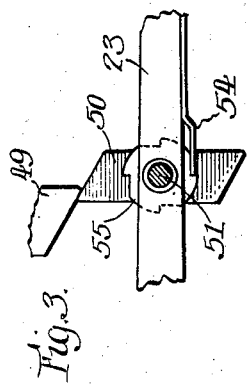
Inventor:
Carl C. Grotnes,
By Chindahl, Parker & Carlson
Attys.

Patented May 6, 1930

1,757,626

UNITED STATES PATENT OFFICE

CARL C. GROTNES, OF CHICAGO, ILLINOIS

METAL-WORKING MACHINE

Application filed January 6, 1928. Serial No. 244,817.

The invention relates to metal working machines and more especially to a machine for operating upon metallic drums or cylinders.

The general object of the invention is to provide means of an advantageous character for automatically positioning the work relative to the operating means in a machine where successive operations are performed upon the same piece of work.

The invention has special application to a machine for forming spaced annular beads in a cylindrical metallic drum, and with this in view a further object is to provide means operating automatically after one bead forming operation to position the drum for the succeeding bead forming operation.

A further object is to provide in a machine of the character indicated having means for automatically stopping the machine after the last bead has been formed.

Another object is to provide, in combination with means controlled by the bead forming means for stopping the machine, means for rendering the stopping means inoperative until the last bead is formed.

Still another object is to provide means operating automatically to move the drum relative to the expanding means after the first bead forming operation, in combination with an automatic stop for limiting the movement of the drum by said positioning means.

In the accompanying drawings I have illustrated a preferred embodiment of my invention as applied to a machine for forming beads in cylindrical metallic drums, it being understood that various changes in the construction and arrangement set forth may be made by those skilled in the art without departing from the spirit and scope of the invention as expressed in the appended claims.

Figure 1 of the drawings is a side elevational view of such a machine, a metallic drum being shown in operative position upon the machine and a portion of the bead forming or expanding means being shown in section.

Fig. 2 is a plan view of the machine, a portion of the drive means being shown in section.

Fig. 3 is a detail view on a larger scale showing part of the means for stopping the operation of the machine after the last bead forming operation.

Figure 1:
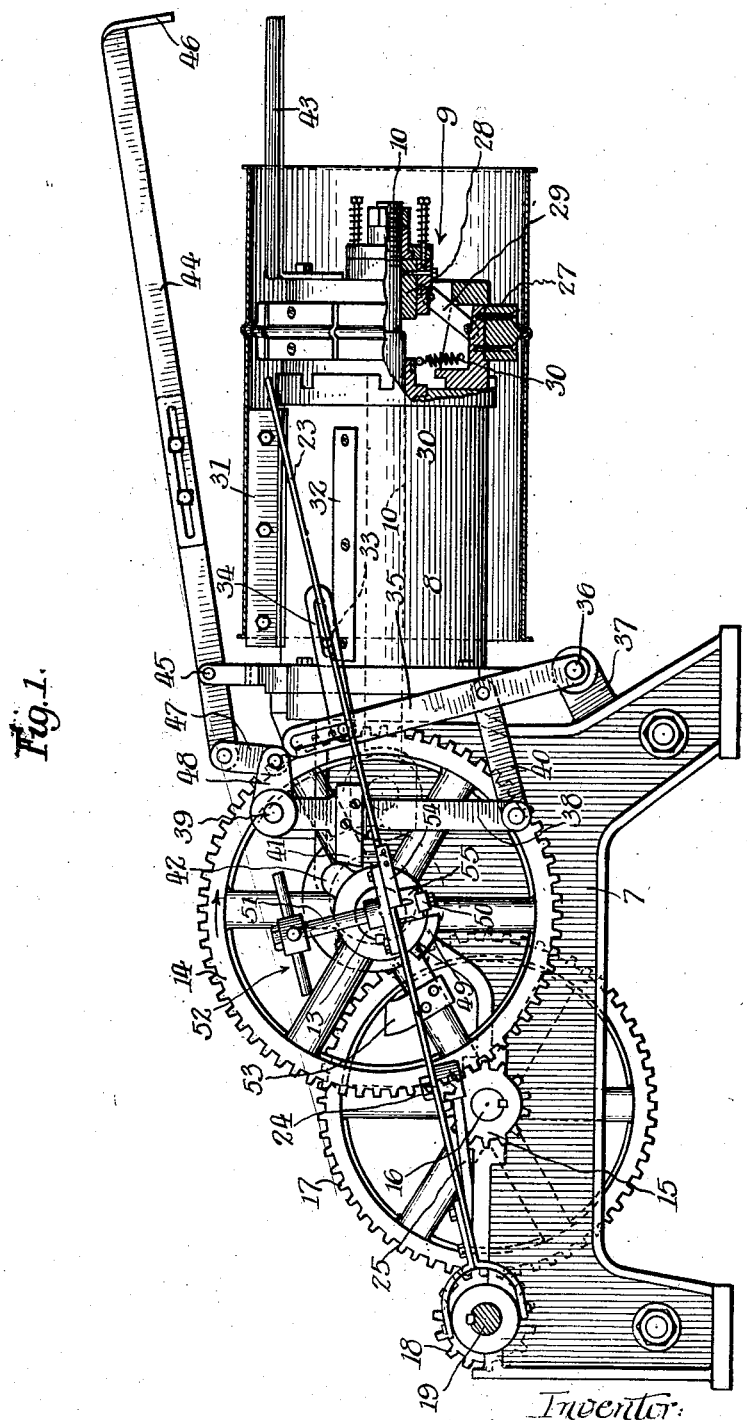

The machine selected for purposes of illustration is of the general type illustrated, described and claimed in my U. S. Patent No. 1,549,868, dated August 18, 1925. It comprises generally a base frame 7 upon the forward end of which is suitably supported in projecting relation a cylindrical head 8. Within the forward end of this head is arranged bead expanding means generally designated by the numeral 9. This means is operated in the reciprocation of a drawbar 10, the latter being actuated through a connection with a source of power. Such connection may consist of a sleeve 11 mounted upon the eccentric 12 of a shaft 13. The shaft 13 is journaled in the frame transversely of the latter, and is arranged to be driven from the source of power through driving connections including a spur gear 14 rigid with one end of the shaft 13; a pinion 15 rigid with a parallel shaft 16 also journaled in the frame; a spur gear 17 rigid with the shaft 16 at the end opposite the pinion 15; a pinion 18 rigid with a shaft 19 journaled in the frame rearwardly of the shaft 16; and a pulley 20 loosely mounted on the extended end of the shaft 19 and adapted to be connected in driving relation with the shaft 19 by means of a clutch generally designated by the numeral 21. The outer end of the shaft 19 may be supported in a stationary bearing bracket 22. The clutch 21 is adapted to be operated by means of a lever 23 pivoted at 24 on a bracket 25 and engaging with a clutch collar 26 operable through suitable means to actuate the clutch.

The bead forming means 9 as herein shown comprises a circular series of radially movable jaws 27 between which and a plunger 28 on the forward end of the drawbar 10 are interposed toggle links 29. The arrangement is such that in the bead forming operation the plunger 28 is moved rearwardly swinging the toggle links 29 to expand the jaws against the action of springs 30; and the jaws are retracted in the forward movement of the drawbar. Inasmuch as the particular construction of the bead forming means forms no part of this invention, it is thought unnecessary to describe the same herein in detail, it being shown and described in my said prior patent above referred to.

In the use of the machine the metallic drum to be operated upon is placed over the head 8 in the position shown in Fig. 1, a supporting bar 31 being secured upon the outer periphery of the head at the upper side thereof to position the drum concentrically with respect to the head. The clutch lever 23 is then operated to start the machine in motion. After the first operating cycle in which the first bead is formed, it is necessary to move the drum forwardly into position for the second bead forming operation. Heretofore this had been done manually and therefore has required the attendance on the part of the operator after the first bead is formed. To avoid this objection, I have provided means operating automatically to reposition the drum for the second operation.

The means herein shown for accomplishing this result comprises a pair of transversely disposed fingers 33 disposed one upon each side of the machine. These fingers are in the form of pins carried by forwardly extending arms 34 and slidably supported on rails 32 secured to the sides of the head 8. The fingers 33 are adjustably mounted in slots in said arms and may in their normal rearward positions constitute stops for determining the initial position of the drum. Means is provided for reciprocating said arms near the end of the first bead forming operation. Thus the rear ends of each of the arms 34 are pivotally connected to the upper ends of lever arms 35 pivoted at their lower ends on a shaft 36, there being one lever arm on each side of the machine. To support the shaft 36, a pair of bearing lugs 37 may be provided on the forward end of the frame beneath the head 8. To operate the arms 35, I provide a pair of levers 38, one on each side of the machine, which levers are fulcrumed at their upper ends upon a transverse shaft 39 and are pivotally connected at their lower ends to the levers 35 by means of links 40. Each of the levers 38 carries near its upper end a block 41 constituting a cam follower with which cam projections 42 rigid with the ends of the shaft 13 are adapted to coact to swing the levers 38. The cam projections 42 are so arranged that as the expanding jaws are retracted to a position such that their diameter is slightly less than the internal diameter of the drum the cam projections 42 operate to swing the levers 38 and thereby the levers 35 to move the arms 34 forwardly. The fingers 33 in this operation engage with the rear end of the drum to slide it forwardly upon the supporting rims 32, it being understood that the system of levers on either side of the head is adjusted to impart a stroke of proper length to the fingers 33. In the forward position of the drum its forward end portion is preferably supported on a pair of forwardly projecting members 43, the rear ends of which are rigidly secured to the forward end of the head 8.

In order to prevent undue forward movement of the drum by the pins 33, I provide a holding device, preferably in the nature of a positive stop. This device normally occupies an inoperative position substantially above the drum, but in the operation of the mechanism to advance the drum, a stop is moved into position to limit such advance. As herein shown the device consists of a lever 44 fulcrumed near its rear end on a pivot 45 and having a downturned end 46 constituting a stop. The rear end of the lever 44 is connected by means of a link 47 with a crank arm 48 rigid with the shaft 39 which turns with the levers 38. The arrangement is such that as the levers 38 operate to move the fingers 33 forwardly, the crank arm 48 operates to swing the lever 44 downwardly and thus position the stop 46 in the path of movement of the drum.

Means is provided which operates under the control of the bead forming means to stop the machine at the end of the second bead forming operation. This means is rendered inoperative at the end of the first bead forming operation by means which will be now described.

The clutch lever 23, as shown clearly in Fig. 2, extends forwardly at one side of the spur gear 14, which is fast on the eccentric shaft 13. Said spur gear 14 carries a cam lug 49 and the lever carries a cam block 50 with which the lug 49 may engage to shift the lever 23 and thereby operate the clutch 21. Inasmuch as the gear 14 makes one revolution for each bead forming operation, it is necessary to render the lever shifting means inoperative at the end of the first bead forming operation. To this end I mount the cam block 50 on a shaft 51 journaled in the lever 23, and on the shaft 51 I provide a star wheel 52 having four teeth or pins the ends of which are disposed in the path of a travelling member 53 rigid with the gear 14. The arrangement is such that when the member 53 engages with one tooth of the star wheel the latter, and thereby the shaft 51, is turned through an arc of 90°. Thus the cam block 50 is turned in successive revolutions of the spur gear 14 alternately into and out of alinement with the lever 23. A spring detent 54 coacts with a ratchet wheel 55 fast on the shaft 51 so as to hold the cam block against reverse rotation.

The arrangement is such that during the revolution of the spur gear 14 in the first operating cycle, the cam block 50 is moved from a position transversely of the lever 23 into substantial alinement therewith. Therefore at the end of this first revolution the lever 23 is not shifted and the drive continues. In the second cycle of operation the star wheel is operated to position the cam block 50 transversely of the lever 23 and at the end of the cycle the cam lug 49 engages with the cam block and thereby shifts the lever 23 to disengage the clutch 21. Thus the machine is brought to a stop at the end of the second cycle, but not at the end of the first cycle.

I claim as my invention:

1. A machine for forming beads in a metallic drum having, in combination, means for supporting the drum, means operative in successive cycles to form beads at spaced points in the drum, means operating automatically on one end of the drum to move the drum after the first operating cycle, and means arranged to engage the other end of the drum for limiting such movement of the drum so as to position it for the second operating cycle.

2. A machine for operating upon a metallic drum comprising, in combination, a frame, a head projecting from one end of the frame over which said work is adapted to be supported, means carried by said head and disposed within the drum so as to operate thereon, drive mechanism on the frame for the last mentioned means, means associated with said drive mechanism and operable near the end of the first operation to move the drum on said supporting means for a second operation and means to limit the movement of the drum comprising a lever pivotally mounted on said frame adjacent the rear end of the drum and extending to the forward end of the drum operable simultaneously with said moving means to cause an abutment on said lever to engage the outer end of the drum.

3. In a machine of the character described, the combination of a support for a drum adapted to permit a longitudinal sliding movement thereof, means adapted to operate upon the drum in successive cycles, a reciprocatory device adapted to engage with the drum to move it on its supporting means, cam actuated means for reciprocating said device upon the completion of one operating cycle whereby to position the drum for the next operating cycle and a stop device operable from a normal inoperative position simultaneously with said reciprocatory device to engage the drum and limit its movement.

4. In a machine of the character described, the combination of a support for a drum adapted, the combination of a support for a drum adapted to permit a longitudinal sliding movement thereof, means adapted to operate upon the drum in successive cycles, a reciprocatory device adapted to engage with the drum to move it on its supporting means, said device comprising a pivoted arm having a drum engaging part, a slide rail for said part, and means for periodically swinging said arm.

5. In a machine of the character described, the combination of a support for a drum movement thereof, means adapted to operate adapted to permit a longitudinal sliding upon the drum in successive cycles, a reciprocatory device adapted to engage with the drum to move it on its supporting means, means for moving said device upon the completion of one operating cycle whereby to position the drum for the next operating cycle, and a stop device operable with the last mentioned means to engage the outer end of the drum to stop the movement of the drum by said advancing means.

6. A metal working machine comprising, a support for the work, means arranged to operate upon the work in successive cycles, drive means for said operating means including a shaft adapted to make one revolution for each cycle of operation, work-positioning means operable after the completion of one cycle, comprising a pair of members arranged to engage opposite sides of the rear end of the work, means for supporting said members, a cam actuated by said shaft, and a pair of levers operatively connected and arranged to transmit motion of said cam to said members.

7. A metal working machine having means for supporting a drum, means for operating upon the drum in successive operating cycles, means for automatically positioning the drum after one operating cycle for the next operating cycle, a lever pivoted at one end of the drum operatively associated with said positioning means to stop movement of the drum by said positioning means, and cam means for actuating said positioning means and lever.

8. A metal working machine having, in combination, means adapted to operate in sucessive cycles upon the work, drive mechanism having a controlling clutch, a lever for shifting said clutch, means operatively associated with said drive mechanism to actuate said lever whereby to stop the machine comprising a shaft adapted to make one revolution in each operating cycle, and means for rendering the clutch shifting means operative only in alternate revolutions of said shaft.

9. A metal working machine having, in combination, means adapted to operate in successive cycles upon the work, drive mechanism having a controlling clutch, a lever for shifting said clutch, means operatively associated with said drive mechanism to actuate said lever whereby to stop the machine comprising a shaft adapted to make one revolution in each operating cycle, the last named means comprising a rotary cam member and a cam follower on said lever, means for pivotally supporting said follower, and means operable in each rotation of said shaft to move said follower either into or out of the path of said cam member whereby to render said clutch shifting means operative only in alternate revolutions of said shaft.

10. In a machine of the character described, the combination of a support for a drum adapted to permit a longitudinal sliding movement thereof, means adapted to operate upon the drum in successive cycles, means to move the drum on its support comprising a member arranged to engage the rear end of the drum, an arm pivotally mounted on said support, a link having one end thereof adjustably mounted on the free end of said arm and carrying said member, means for rocking said arm upon the completion of one operating cycle to position the drum for the next operating cycle, and a stop device for engaging the outer end of the drum to position the drum for the second operating cycle, said device being carried on a lever pivotally mounted on said support and operatively connected with said arm.

11. In a machine of the character described, the combination of a support for a drum adapted to permit a longitudinal sliding movement thereof, means adapted to operate upon the drum in successive cycles, and means to move the drum on its support comprising a pair of members arranged to engage on opposite sides of the rear end of the drum, arms pivotally mounted on said support and having slots in their free ends, a pair of links having one end thereof mounted on pins adjustable in said slots and having slots in their free ends in which said members are adjustably mounted and means for rocking said arms upon the completion of one operating cycle to position the drum for the next operating cycle.

12. In a machine of the character described, the combination of a support for a drum adapted to permit a longitudinal sliding movement thereof, means to operate upon the drum in successive cycles and means to move the drum on its support to position the drum for a second operation comprising an arm pivotally mounted on said support adjacent the rear end of the drum, means for engaging the drum operable by said arm and adjustably mounted upon said arm to vary the distance through which the drum is moved and means for rocking said arm upon the completion of one operating cycle to position the drum for the next operating cycle.

13. A metal working machine having, in combination, means to operate in successive cycles upon the work, drive mechanism having a controlling clutch, a lever for shifting said clutch, means operatively associated with said drive mechanism to actuate said lever to stop the machine comprising a shaft adapted to make one revolution in each operating cycle, means operable with said shaft adapted to shift said clutch lever including a device movably mounted on said lever and means operable during certain rotations of said shaft to move said device and render said clutch disengaging means ineffective.

In testimony whereof, I have hereunto affixed my signature.

CARL C. GROTNES.

CERTIFICATE OF CORRECTION.

Patent No. 1,757,626.  Granted May 6, 1930, to

CARL C. GROTNES.

It is hereby certified that error appears in the printed specification of the above numbered patent requiring correction as follows: Page 3, lines 61 and 62, claim 4, strike out the words "the combination of a support for a drum adapted"; same page, line 74, claim 5, strike out the words "adapted to permit a longitudinal sliding" and insert the same to follow after the word "drum" line 71, same claim; and that the said Letters Patent should be read with these corrections therein that the same may conform to the record of the case in the Patent Office.

Signed and sealed this 24th day of June, A. D. 1930.

(Seal)

M. J. Moore,
Acting Commissioner of Patents.